US009189208B2

(12) United States Patent  (10) Patent No.: US 9,189,208 B2
Hammontree et al.  (45) Date of Patent: Nov. 17, 2015

(54) INLINE DISPLAY AND PREVIEW OF RELATED INFORMATION FOR ELEMENTS IN A DOCUMENT

(71) Applicant: Microsoft Corporation, Redmond, WA (US)

(72) Inventors: Monty Hammontree, Duvall, WA (US); Murali Krishna Hosabettu Kamalesha, Redmond, WA (US); Brandon Adams, Auburn, WA (US); Steven John Clarke, Edinburgh (GB); Oleg Tkachenko, Redmond, WA (US); Zachary S Zaiss, Seattle, WA (US); John Tilford, Seattle, WA (US); David Pugh, Bellevue, WA (US); Daniel Dole, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 51 days.

(21) Appl. No.: 13/907,853

(22) Filed: May 31, 2013

(65) Prior Publication Data

US 2014/0282378 A1 Sep. 18, 2014

Related U.S. Application Data

(60) Provisional application No. 61/786,105, filed on Mar. 14, 2013.

(51) Int. Cl.
*G06F 17/00* (2006.01)
*G06F 17/20* (2006.01)
*G06F 17/28* (2006.01)
(Continued)

(52) U.S. Cl.
CPC .......................................... *G06F 8/33* (2013.01)

(58) Field of Classification Search
CPC ............... G06F 8/33; G06F 8/20; G06F 8/60; G06F 8/67; G06F 9/4425; G06F 8/71; G06F 11/323; G06F 11/362; G06F 11/3604; G06F 11/3624; G06F 11/3664; G06F 17/24; G06F 17/211
See application file for complete search history.

(56) References Cited

U.S. PATENT DOCUMENTS 6,353,923 B1 * 3/2002 Bogle et al. ................... 717/128
6,493,868 B1 * 12/2002 DaSilva et al. ............... 717/105

(Continued)

OTHER PUBLICATIONS

Desmond, et al., "An Evaluation of the Inline Source Code Exploration Technique", Retrieved at <<http://www.ppig.org/papers/21st-desmond.pdf>>, In Proceedings of the Annual Workshop of the Psychology of Programming Interest Group, Jun. 24, 2009, pp. 16.
"AppCode 1.6—Objective-C IDE That Makes a Difference", Retrieved at <<http://web.archive.org/web/20130310150732/http://www.jetbrains.com/objc/>>, Mar. 10, 2013, pp. 5.
Storey, et al.,"Shared Waypoints and Social Tagging to Support Collaboration in Software Development", Retrieved at <<http://dl.acm.org/citation.cfm?id=1180906>>, In Proceedings of the 20th Anniversary Conference on Computer Supported Cooperative Work, Nov. 4, 2006, pp. 4.

(Continued)

*Primary Examiner* — Don Wong
*Assistant Examiner* — Anibal Rivera
(74) *Attorney, Agent, or Firm* — Kevin Sullivan; Kate Drakos; Micky Minhas

(57) ABSTRACT

Disclosed herein is a system and method for optimizing a developer's ability to find and navigate relevant documents, relationships, and other information related to an identifier in the code they are developing. An inline viewport is presented to the user in response to the user selecting an identifier in the code whereby the user is able to see relevant information related to the identifier in a spatially consistent location with the code they are investigating. Further, the developer has the ability to make changes to the code in the viewport without leaving the current editor.

18 Claims, 10 Drawing Sheets

(51) Int. Cl.
  *G06F 9/44* (2006.01)
  *G06F 9/45* (2006.01)

(56) References Cited

U.S. PATENT DOCUMENTS

| | | | | |
|---|---|---|---|---|
| 7,484,203 | B2* | 1/2009 | Drake | 717/126 |
| 7,584,456 | B1* | 9/2009 | Veenstra et al. | 717/124 |
| 7,721,196 | B2* | 5/2010 | Tilford et al. | 715/236 |
| 8,166,470 | B2* | 4/2012 | Ellison | 717/169 |
| 8,972,953 | B2* | 3/2015 | Tamm | 717/129 |
| 2004/0172623 | A1* | 9/2004 | Eckels et al. | 717/125 |
| 2005/0034109 | A1* | 2/2005 | Hamilton et al. | 717/140 |
| 2006/0064677 | A1* | 3/2006 | Bickson et al. | 717/124 |
| 2009/0070738 | A1* | 3/2009 | Johnson | 717/106 |
| 2011/0154295 | A1* | 6/2011 | Aharoni et al. | 717/125 |
| 2011/0302556 | A1* | 12/2011 | Drukman et al. | 717/113 |
| 2012/0131547 | A1* | 5/2012 | Muir | 717/109 |
| 2012/0324423 | A1 | 12/2012 | Khan et al. | |
| 2013/0074036 | A1* | 3/2013 | Brandt et al. | 717/113 |

OTHER PUBLICATIONS

Janzen, et al., "Navigating and Querying Code without Getting Lost", Retrieved at <<http://dl.acm.org/citation.cfm?id=643622>>, In Proceedings of the 2nd International Conference on Aspect-Oriented Software Development, Mar. 17, 2003, pp. 10.

Bragdon, et al., "Code Bubbles: Rethinking the User Interface Paradigm of Integrated Development Environments", Retrieved at <<http://128.148.32.110/people/spr/codebubbles/icsefinal.pdf>>, In Proceedings of the 32nd ACM/IEEE International Conference on Software Engineering, May 2, 2010, pp. 10.

"Advanced Code Editor", Retrieved at <<http://web.archive.org/web/20130114214917/http://www.jetbrains.com/objc/features/>>, Jan. 14, 2013, pp. 8.

Elves, Robert Douglas, "NavTracks—Helping Developers Navigate Source Code", Retrieved at <<http://webhome.cs.uvic.ca/~chisel/thesis/REIvesThesis.pdf>>, In Proceedings of Doctoral Dissertation, University of Victoria, Jan. 1, 2005, 70 pages.

* cited by examiner

INLINE DISPLAY AND PREVIEW OF RELATED INFORMATION FOR ELEMENTS IN A DOCUMENT

CROSS REFERENCE TO RELATED APPLICATIONS

This application claims the benefit of and priority to U.S. Provisional Patent Application Ser. No. 61/786,105 entitled "INLINE DISPLAY AND PREVIEW OF RELATED INFORMATION FOR ELEMENTS IN A DOCUMENT", filed Mar. 14, 2013 by Monty Hammontree, et al., the entire contents of which are hereby incorporated by reference for all they teach and contain.

TECHNICAL FIELD

This description relates generally to tools to assist a developer in navigating and developing code through the use of inline views of related information.

BACKGROUND

Developers spend a large portion of their development time trying to understand how various components of code relate to each other. They often have to move through a number of windows and files just to find the relevant information. Once they have found the relevant information the developer often has a hard time returning back to their code to continue their coding, or remember the process that took them to the particular document of interest.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a system and method for optimizing a developer's ability to find and navigate relevant documents, relationships, and other information related to an identifier in the code they are developing. Through the use of inline viewports, the developer can see the relevant information in a spatially consistent location with the code they are investigating. Further, the developer has the ability to make changes to the code in the viewport or dive further into portions of the viewport document without having to leave the current editor.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 3 is an illustrative screen display of code and identifiers according to one illustrative embodiment.

FIG. 4 is an illustrative screen display illustrating the insertion of the viewport into the native code according to one illustrative embodiment.

FIG. 6 is an illustrative screen display illustrating the ability to scroll or view outside the entity of interest according to one illustrative embodiment.

Like reference numerals are used to designate like parts in the accompanying drawings.

DETAILED DESCRIPTION

Figure 1:
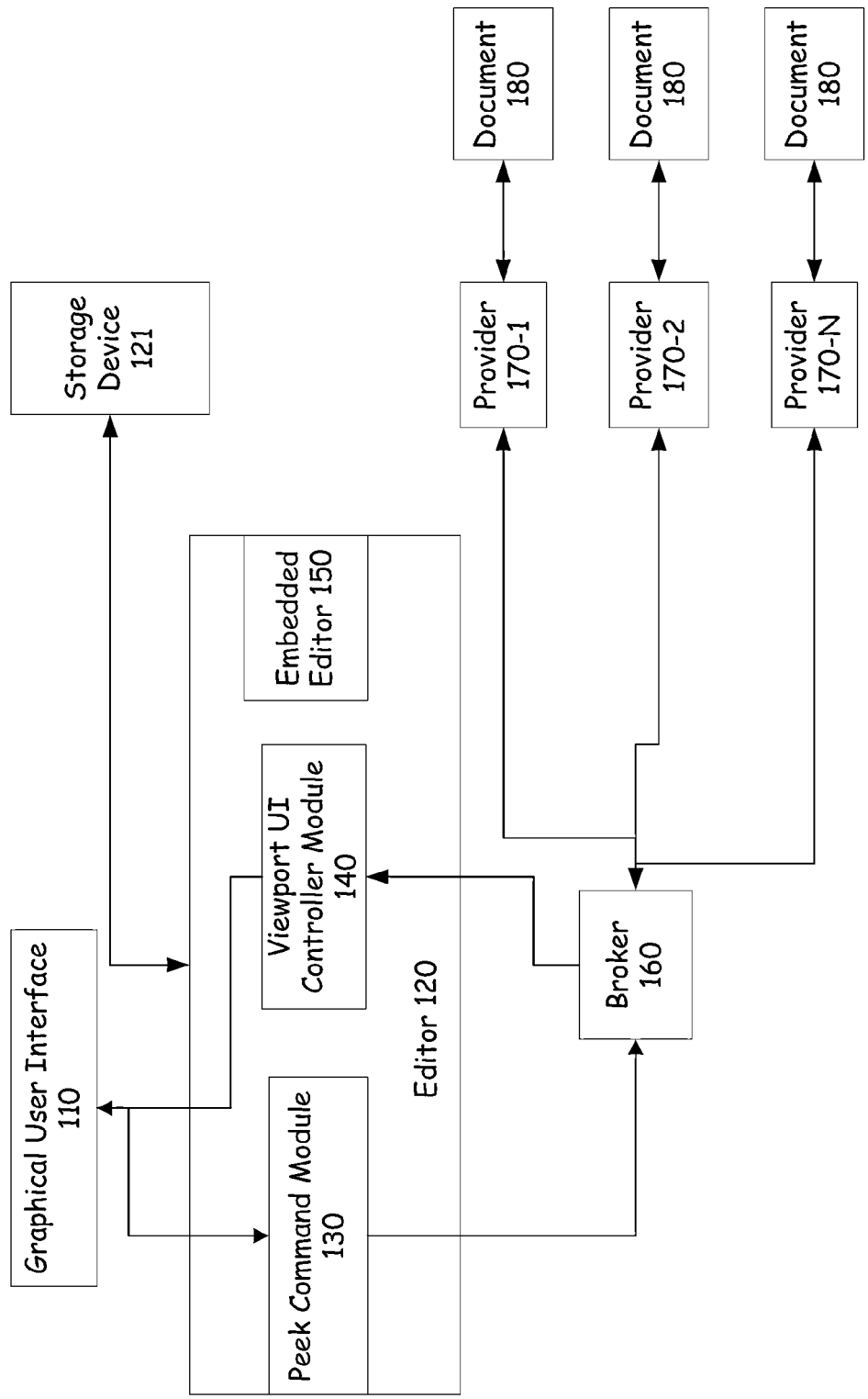
FIG. 1 is a functional block diagram illustrating the components of the inline view system of the IDE system to one illustrative embodiment.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. This is distinct from computer storage media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Developers spend a large portion of their time understanding the relationships between various elements in the coding process. This process includes looking at the elements in the code and understanding how that element is used in other portions of code, the relationships the element has to other portions of code, and the relationship of the element in a file, class, method analysis among others. This process comes at the expense of spending their time actually developing and writing code for their particular application.

Developers often use integrated development environments (IDE) such as Visual Studio, Eclipse or Adobe Edge, to develop and manage software and applications. IDEs are designed to maximize a developer's productivity by providing components with similar user interfaces. IDEs present a single program in which all development of the application may be performed. Most IDEs provide tools for the developer to author, modify, compile, deploy and debug software and applications.

The IDE provides multiple development utilities as a cohesive unit that the developer can use. For example, in and IDE code can be continuously parsed while it is being edited, providing instant feedback to the developer when syntax errors are introduced. Most IDEs allow the developer to write code in multiple languages. However, some IDEs are limited to a single programming language.

FIG. 1 is a block diagram illustrating the components of an IDE system 100 according to one illustrative embodiment. IDE system 100 includes a graphical user interface 110, an editor 120, a peek command module 130, a viewport UI controller module 140, an embedded editor 150, a broker 160, and a plurality of providers 170-1, 170-2, 170-N. These components are used by the system 100 to enable the user to view or "peek" into code that is contained in other documents or files during the development of code.

The graphical user interface 110 is the display that is presented to the user when the user is writing code in the IDE. While not illustrated in FIG. 1 it should be understood that graphical user interface 110 includes other components typically found in a computer system such that the user can interact with elements that are displayed on the graphical user interface 110, such as a keyboard and a mouse. In some embodiments the graphical user interface 110 is touch enabled, such that the user can physically touch the display to interact with the elements displayed therein. Further, in other embodiments the graphical user interface 110 can include optical sensors that can determine motion and hence gestures from the user without the user having to physically touch any component of the graphical user interface 110 to interact with the displayed elements.

Editor 120 is the component of the IDE system 100 that allows the user to write, edit, debug or otherwise interact with code. Code is stored in files or documents on storage device 121. When the user desires to interact with the code the code is loaded into the editor 120 and then displayed to the user via the graphical user interface 110. Editor 120 allows the user to code in a variety of programming languages. Further, the editor 120 saves code development back to storage 121 on a regular basis, either through an automatic saving function or through manual saves from the user.

Peek command module 130 is a component of the editor 120 that is configured to receive from the user either a general request or a specific request for a listing of a set of relationships that involve a specific identifier that is displayed in the code provided by editor 120. An identifier is text in code that uniquely identifies a variable, method, class or some other data type and may participate in a relationship with other code constructs. A general request is a request for all relationships that the particular identifier participates in. A specific request is a request of a specific type of relationship that the identifier participates in. Specific requests are in one embodiment made by using "hotkeys" that are provided by the editor 120, and contain specific meaning to the command module 130. The command module 130 takes these requests and passes the request on to the broker 160. The peek command module 130, also receives from the user interface 110 an indication of a selected relationship that the user wishes to see in the viewport. The peek command module passes this indication to the broker 160 for further processing.

Viewport UI controller module 140 (also referred to as viewport controller module 140 herein) is a component of the editor 120 that receives from the broker 160 information that was provided by the providers 170 related to the identifier to display the appropriate code in a viewport (or inline view) to the user. Initially, the viewport UI controller module 140 causes the list of relationships to be displayed to the user in association with the user's request for the relationships on the user interface 110. Once the user has selected the desired relationship, the viewport UI controller module 140 uses the information provided by the associated provider to create the viewport in the code and to position the entity of interest within view within the associated document or file that was selected by the user according to the information provided by the associated provider 170 of the document 180. Viewport UI controller module 140 also creates the visual or other cues in the viewport such that when the user navigates within the document 180, the user is able to know when they are navigating outside of the entity of interest in the document that was originally displayed in the viewport.

The embedded editor 150 is a component of the editor 120 that permits the editing of a second document or file within the editor 120. The first document being the native document the user is working with and the second document being a document from outside the native document. e.g. the document 180 received from the provider and displayed in the viewport. Specifically, the embedded editor 150 allows for the editing of code within the viewport simultaneously with the code displayed in the editor. Editor 150, in one embodiment, includes its own versions of module 130 and module 140, such that the user may see entities of interest in the document 180 displayed in the viewport and access related documents. In some embodiments editor 150 may include its own embedded editor. This alternative embodiment permits the editing of cascading documents.

Broker 160 is a component of the IDE system 100 that is configured to receive from the peek command module 130 the request for the set of relationships that the selected identifier participates in. The broker 160 takes the identifier and passes it on to each of the providers 170. The broker receives information from the providers 170 indicating that they have content that is related to the selected identifier, in for example a file or a document. The broker 160 passes this information to the viewport UI controller module 140.

The broker 160 is further configured to receive from the peek command module 130 an indication of a selected relationship. Based on the selected relationship the broker 160 queries the appropriate provider 170, and receives from that provider 170 in one embodiment, the associated file or document 180. This document 180 is then passed to the viewport UI controller module 140 which then inserts the file or document 180 into the code using the created viewport. In an alternative embodiment the broker 160 receives back from the provider 170 the path and file name of the file that contains the result. In yet another embodiment, the results include the span of the text in within the identified file indicating the start and end lines as well of column numbers that contains the results.

Providers 170-1, 170-2, 170-N (collectively provider 170) are, in one embodiment, providers of documents, files and other assets that are used in the development of code, such as those typically found in a provider model of distributed development. Providers 170 may be locally situated such that they are part of the direct system that the user is interacting with, or can be located out in the cloud or other network such that the providers 170 are distributed and possibly participating in multiple development environments. The providers 170 receive requests for related entities of interest from the broker 160 and determine if the particular provider 170 has a file, document, web link, or other asset 180 that is somehow related to the identifier passed to it by the broker. If the provider 170 has one or more items that are related to the identifier it responds to the broker 160 request with items that match the request and the relationship information for that item. In one embodiment, the provider returns the file or document 180 to the broker 160 along with position information indicating where in the file or document 180 the related item can be found. In alternative embodiment the provider does not provide the document 180 until such time as the broker 160 requests the document from the provider 170.

Figure 2:
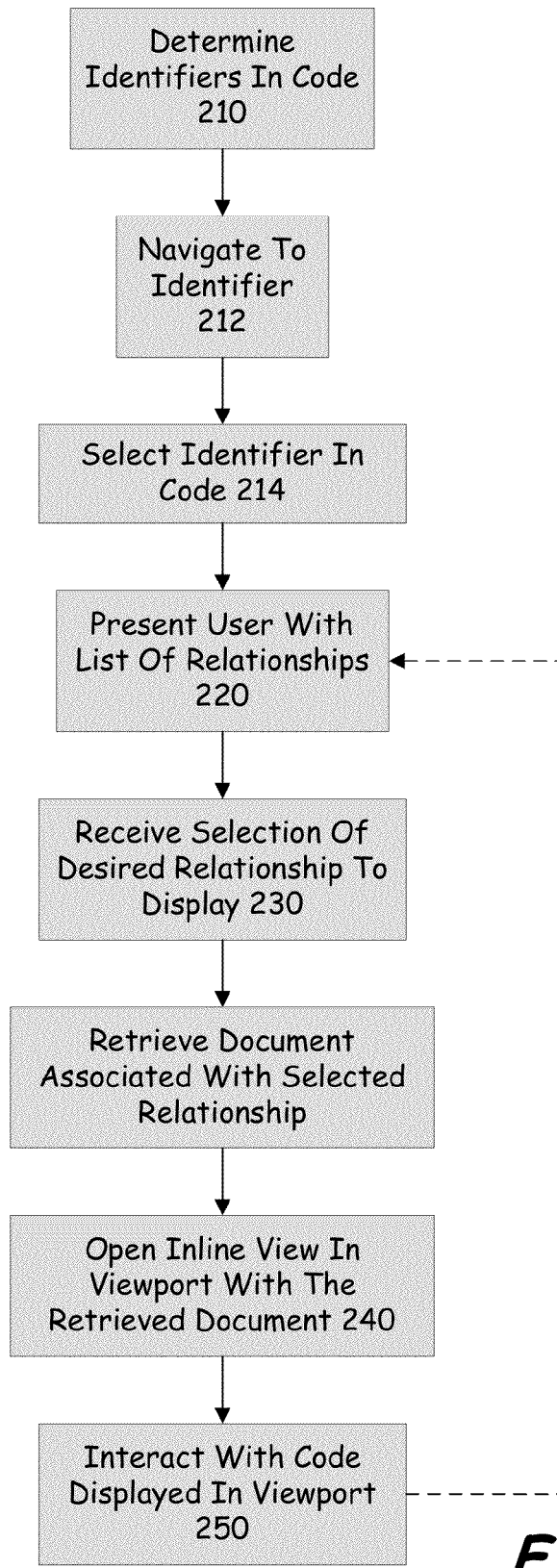
FIG. 2 is a flow diagram illustrating the process for opening an inline view according to one illustrative embodiment.
Figure 3:
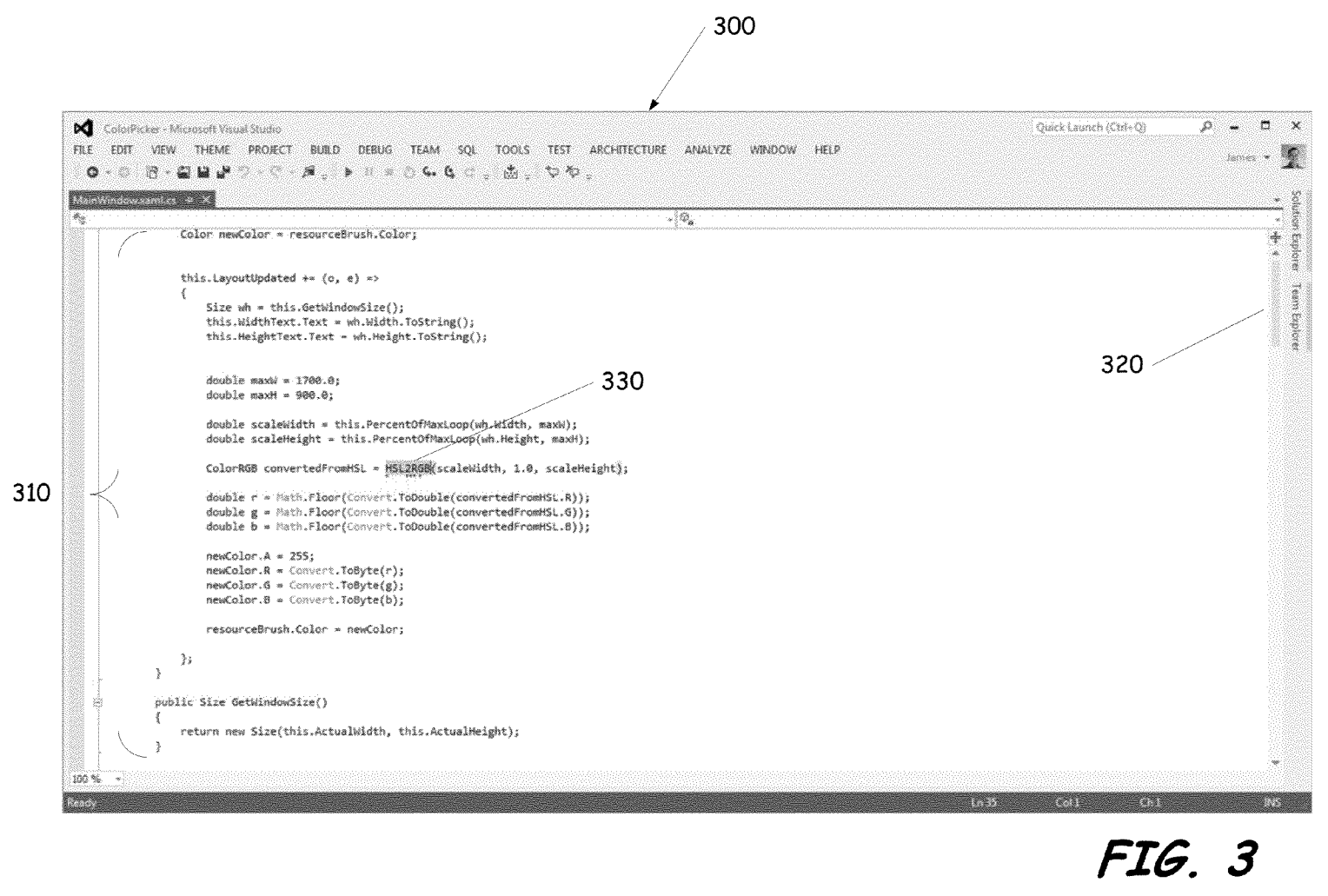
Figure 4:
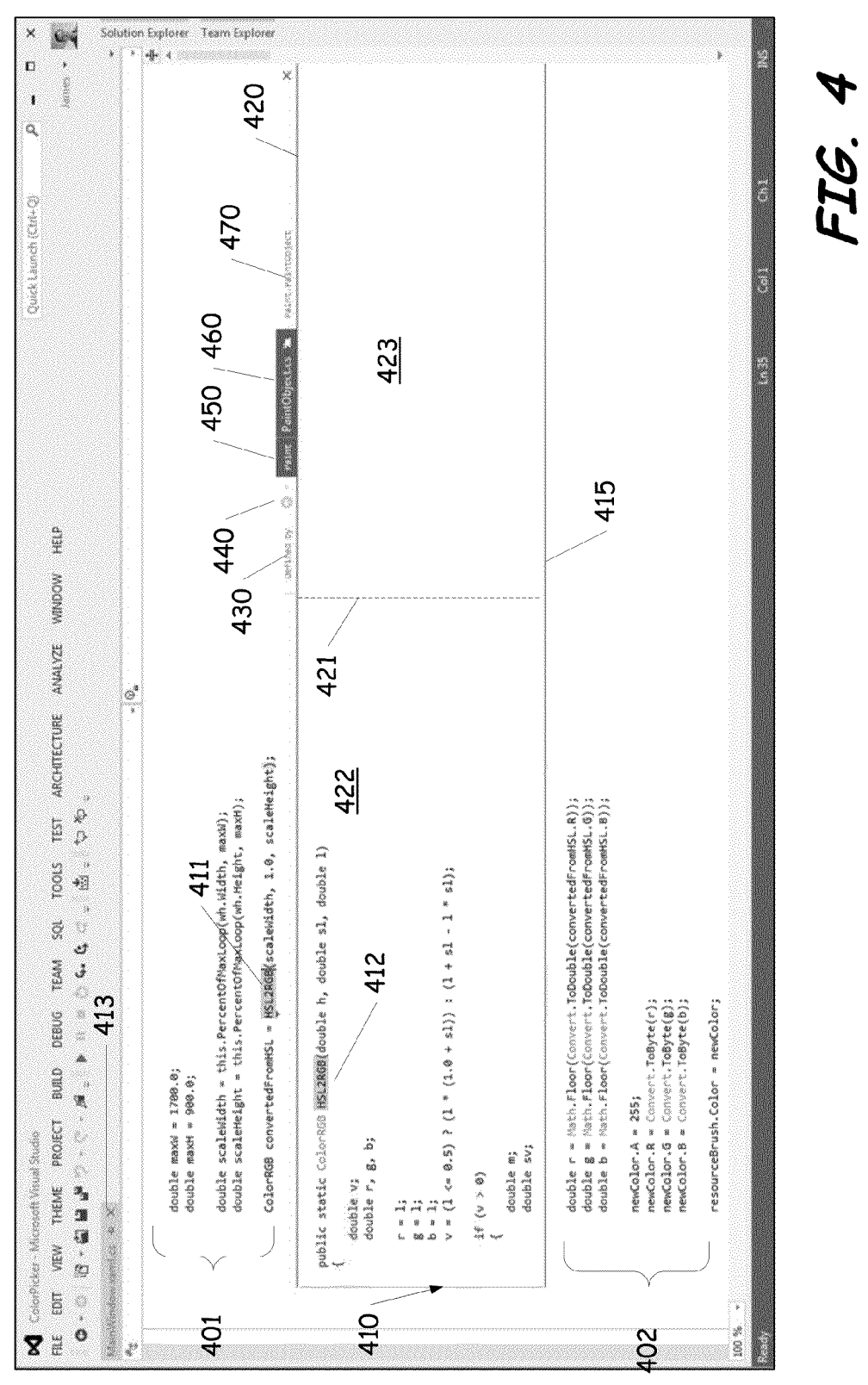

FIG. 2 is a flow diagram illustrating the process for using the inline viewing features of the present disclosure. FIGS. 3-4 illustrates the graphical user interfaces that are generated by IDE and displayed to the user according to one illustrative embodiment while the process of FIG. 2 is performed.

FIG. 3 is an illustrative screen shot of a display 300 that the user may view when using the system 100 of the present disclosure. Displayed in FIG. 3 is the code 310 which is representative of the code that a user would be interacting with. An identifier 320 is shown as highlighted. This identifier 320 has been identified by the system 100 as an identifier according the description provided below with regards to FIG. 2. Also displayed on display 300 is a scroll bar and slider 330. Scroll bar and slider 330 permit the user to navigate to portions of the code that are not displayed on display 300, but are present in the associated document.

While the developer is coding an application, system 100 is, in one embodiment, constantly determining what portions of text in the code can be determined to be an identifier. This is illustrated at block 210. An identifier can be anything that has relations to metadata, other identifiers or information that the system 100 is aware. In an alternative embodiment an identifier is determined when the user highlights or otherwise selects a portion of text in the code. Thereby positively identifying the text as an identifier to system 100. In this embodiment steps 210-214 are combined. As mentioned above an example identifier is illustrated by identifier 320 in FIG. 3.

When the user is desirous of obtaining additional information related to a identifier that the system 100 has determined is a identifier, the user navigates to the specific identifier through the graphical user interface 110. This navigation can include using a mouse to move a cursor over the particular identifier, using touch to bring the cursor to the identifier, gesturing in order to bring the cursor to the particular identifier, or any other method to move the cursor on the graphical user interface 110. This is illustrated at block 212.

Once the user has navigated to the desired identifier the user then makes an indication that they wish to see the relationships or sets of relationships associated with the desired identifier. This is illustrated at block 214. The user may make this indication, in one embodiment, by double clicking on the identifier. However, in other embodiments other methods and approaches may be used to indicate the selection of the identifier. This can include hovering over the identifier, circling the identifier, using a right click on a mouse, or any other method that may be used to indicate a selection of the identifier.

Following the receipt of the indication the user is presented with a list or set of relationships that have been determined by the system 100 for the identifier. This list may be presented to the user on the user interface through a number of possible user interface affordance methods. In one embodiment the system presents to the user a floatie menu (e.g. a menu that pops up when the user hovers over the particular identifier) that lists the relationships. This affordance method allows the user the ability to view and choose between multiple types of relationships that the code identifier of origin participates in (e.g., defined by; referenced by; etc). In other embodiments a drop down list may be presented to the user. However, any method of presenting to the user a list of the relationships that the identifier participates in may be employed. This is illustrated at block 220. In some embodiments the entire list of relationships are presented to the user. In other embodiments only a subset of the list of relationships is presented to the user. In yet another embodiment the list is generated in real time where the relationships (or a subset of relationships) are presented to the user as the system 100 discovers or determines they are relevant to the identifier. Typically the providers 170 discussed in FIG. 1 provide results the broker 160. In this embodiment additional relationships, or subsets of the relationships, are presented to the user as they are later discovered or determined by the system 100. The relationships that are displayed on the user interface 110 at this step in the selection process can include the definition of the identifier, other code locations where the identifier appears, articles or documentation related to the identifier, or any other information that the system 100 determines is related to the identifier.

The user when viewing the list of relationships for the identifier is able to select the specific relationship that the user desires to review. The user may make this selection through any method of indicating the selection, such as mouse click, hot key input, touching the selection, etc. The user makes the selection of the relationship of interest at block 230.

Once the selection of the relationship is made at block 230, the system 100 proceeds to retrieve the document associated with the selected relationship. This is illustrated at step 235. In some embodiments the document is retrieved from the broker which received the document from the providers. In other embodiments upon the selection the system 100 proceeds to request the desired document from the providers.

Once the document has been retrieved the system 100 proceeds to open an inline view of the relationship in the native code at block 240. This inline view inserts the selected relationship in the currently viewed code by creating a viewport through which the portion of the document 180 ("entity of interest") which caused the relationship to be shown is exposed to the user through the graphical user interface 110. In one embodiment the entity of interest is displayed by creating a visual break point in the code currently displayed in the editor 120, and inserting a viewport into a space created in the code by the visual break point. At the break point in the code the lines that were below the break point move away from the identifier that was selected to create a space for the viewport to be displayed. Thus, when looking at the code in the user interface, the original portion of the code is broken by the viewport. This is illustrated in FIG. 4 by elements 401, 402 and 410 which will be discussed in greater detail below. In some embodiments the inline view is presented to the user in a form such that the viewport 410 appears to be nothing more than another instance of the editor. In this embodiment users are able to read content in the viewport 410 using the same settings that are present in the current editor, e.g. font, colors, and settings from the main editor are carried over into the viewport 410.

With the viewport 410 inserted into the native code 310, the developer is able to view the entity of interest at the same time they are able to view the original code 310 (illustrated in sections 401 and 402) in which they were working with. In some embodiments the viewport 410 is sized according to the size of the entity of interest. For example if the entity of interest is eight lines, then the viewport would be sized to show all eight lines of the entity of interest. If the entity of interest is twenty lines, the viewport can be sized to show all twenty lines of interest. However, in other embodiments the viewport may be limited in display size based on the size of the display or other settings. These limitations may make it impossible to show the entire entity of interest to the user within the viewport 410. In these instances a scroll bar may be presented to the user to enable the user to scroll through the entity of interest to review the entity completely.

In contrast to other approaches the user is able to interact with the entity of interest in a variety of different ways. This interaction with the viewport is illustrated at block 250. In some embodiments the system 100 is configured to classify identifiers in the code that are visible to the user through the viewport. In this embodiment the user is able to choose an identifier in the code that they are interested in seeing the relationships associated with that identifier. The user selects this identifier and the process returns to block 220 of FIG. 2 and repeats the process of FIG. 2 described above. In one embodiment the document displayed in the viewport 410 is replaced by the document for the selected identifier such that only one viewport is open. However, other embodiments may permit multiple viewports to be open simultaneously. The process of cascading through the code will be described in greater detail with regards to FIGS. 7-9 below.

Figure 6:
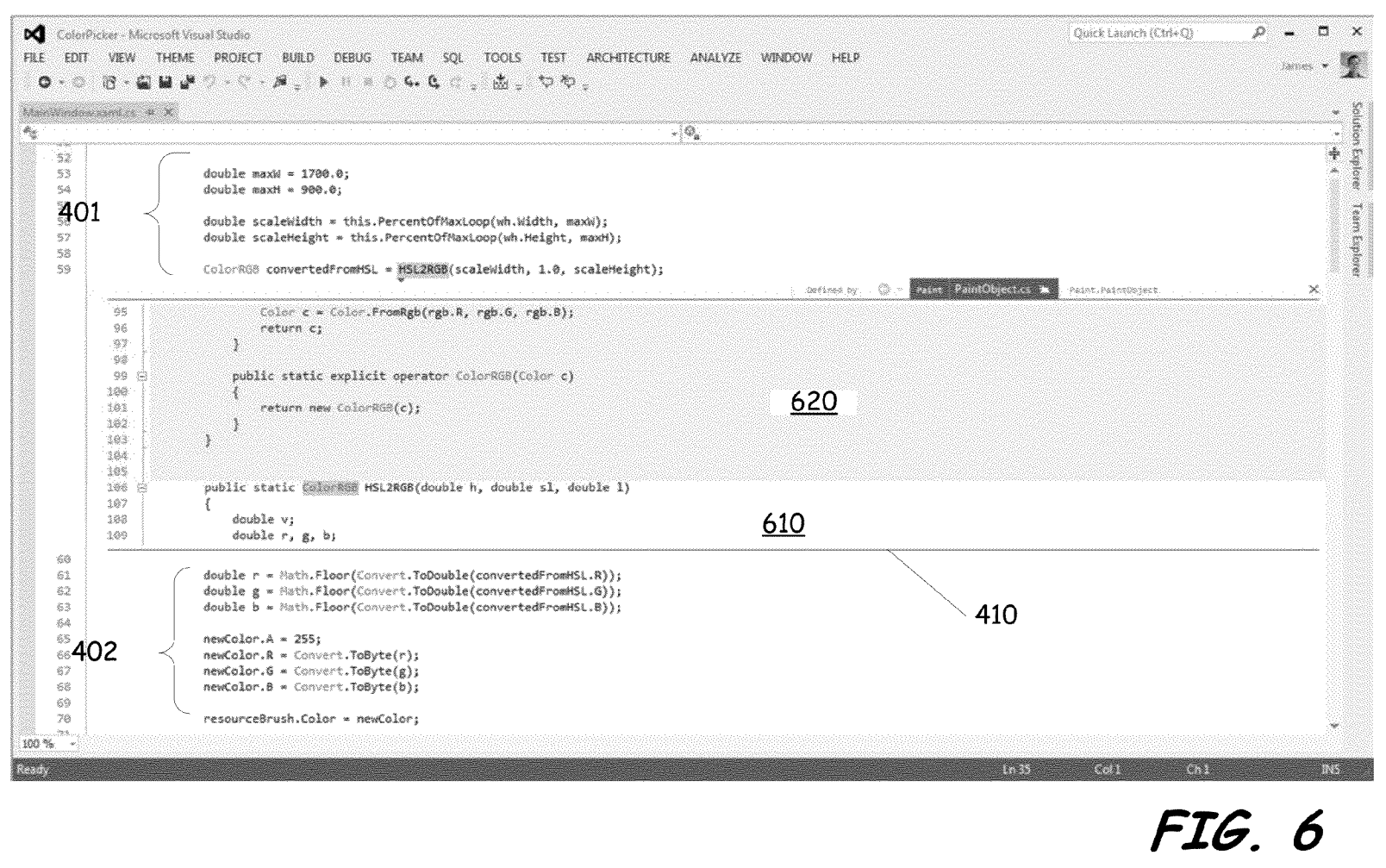

In another embodiment the viewport includes not only the entity of interest and its related code, but also the code that surrounds the entity of interest. Many times a developer needs to see the entity of interest in the environment in which it is used. This allows the user to better understand the context of the entity and assists the user in writing better code in the native code window. FIG. 6 discusses the interaction that the user can have through the viewport when more code than just the entity of interest is presented. In these instances, the entire file or document associated with the selected relationship is instantiated in the embedded editor 150 and the position of the entity of interest is used by the viewport UI controller 140 to determine where in the file or document the entity of interest is and cause that portion of the file or document to be displayed in the viewport when the viewport is presented to the user on display 110 at block 240.

Figure 5:
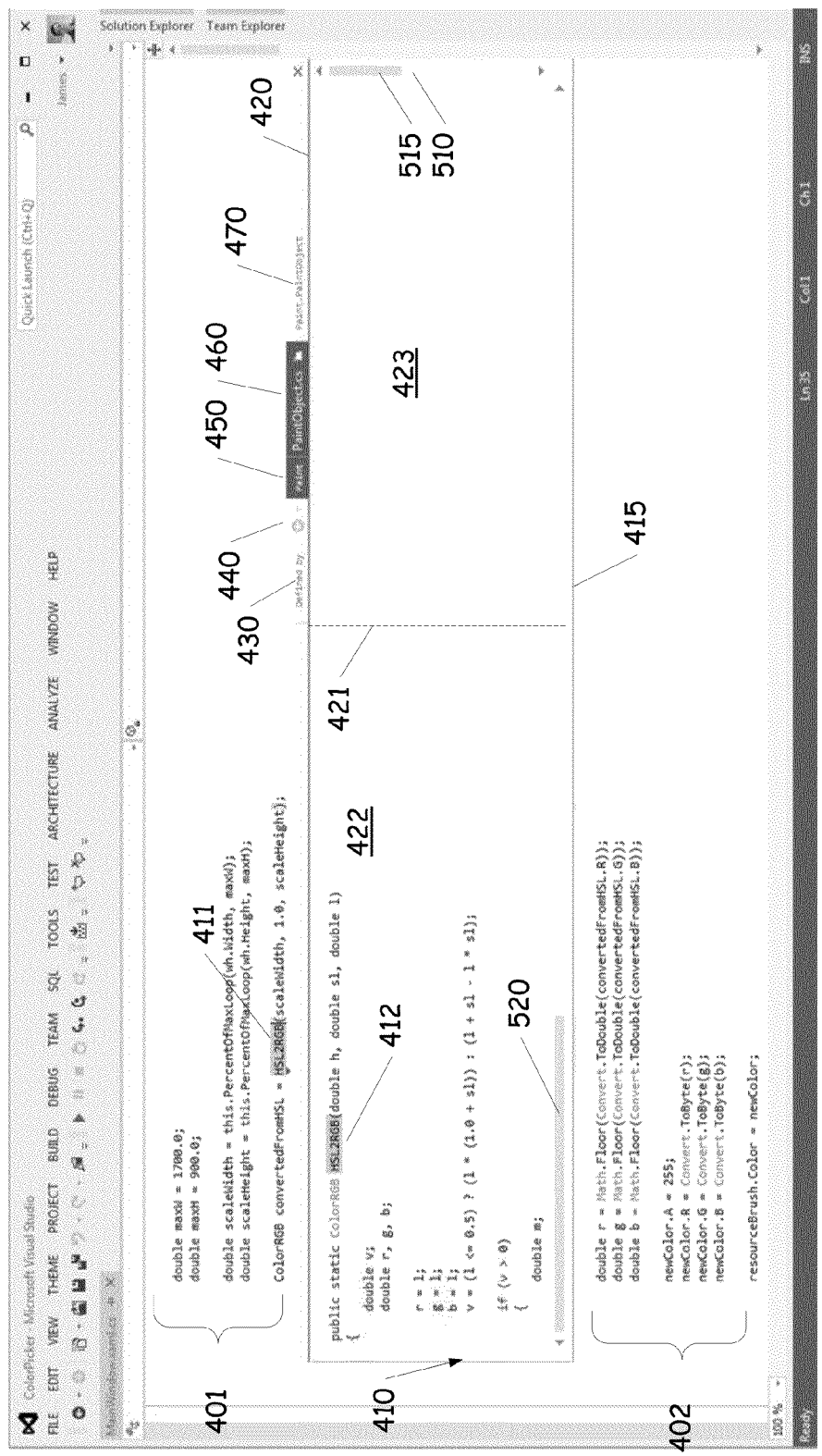
FIG. 5 is an illustrative screen display illustrating the use of scroll bars within the viewport inserted into the native code according to one illustrative embodiment.

Now that the user has the viewport open, the user can interact and view either just the entity of interest or the entire document or file associated with the entity of interest that was provided by the provider 170 depending on how the system 100 has been configured and set up. FIGS. 4 and 5 are equally applicable to both of these embodiments. FIG. 4 illustrates an exemplary embodiment where the viewport 410 has been opened and placed in between the code portions of code 310 illustrated in FIG. 3. Specifically, viewport 410 is illustrated directly below launch point 411. Launch point 411 is the selected identifier in the code, such as identifier 320, that caused the viewport 410 and entity of interest to be displayed. Inside viewport 410 is the entity of interest that was returned by provider 170. Landing point 412 is shown as highlighted in FIG. 4. This highlighting of landing point 412 allows for the user to understand, visually, where in the code they started when they opened the viewport 410. This highlighting is useful when the entire code associated with the entity of interest cannot be displayed in the viewport 410 as opposed to just a clip or snip of the code containing the entity of interest.

The viewport 410 includes a visual indicator that visually separates the code 401 and 402 from the content of the viewport 410. This visual separation helps the user understand that the portion of the code displayed in the viewport 410 is not part of the actual code 401 and 402 that the developer is currently working with. This visual separation can be achieved through a number of means. For example, additional whitespace may be presented in between the viewport 410 and code 401 and 402 than would normally be present in the display. In other embodiments, visible lines are placed such that a box is formed around the entity of interest. In other embodiments, line numbers are presented for both code 401 and 402 and for the code in the viewport 410. The code in the viewport may be visually indented from the code 401 and 402 such that the user would readily recognize that the viewport code is not part of code 401 and 402. In yet another embodiment, the code in the viewport 410 is presented with a different background color than that code 401 and 402. In the embodiment illustrated in FIG. 4 the viewport is separated from code 401 and 402 by using box 415.

At the top of box 415 of the viewport 410 is a header 420. The header 420 presents information that allows the user to interpret how the content of the viewport 410 relates to the content displayed in the main editor and to allow the user to easily determine where the viewport 410 content comes from, according to one illustrative embodiment. Those skilled in the art will readily recognize that the information presented by header 420 can be presented to the user in a number of different ways and different orders. The header 420 is illustrated here as an example. It should be noted that in some embodiments the header 420 is constantly present, where in other embodiments the header 420 may appear only when the user desires to see the header information. In some embodiments the header 420 is displayed when the user moves the cursor over the location where the header 420 is located.

Turning to the header 420 and moving from left to right on the header 420 of FIG. 4. On the left, the relationship of the launch point 411 to landing point 412 is shown by 430. Next, a back button 440 is illustrated. Back button 440 affords the user access to the stack of peeks that the user has viewed in this viewport session. This is relevant to instances where cascade or recursive peeks are enabled. However, FIG. 4 illustrates the back button 440 as disabled because the user is viewing the results of the first peek. If the user were further in the cascade or recursive peek process these buttons would be enabled.

Next is the project name 450, followed by the file name 460. This allows the user to understand the location from where the information displayed in the viewport 410 originated from. This information may allow the user to better understand the context of the result that they are viewing. These are presented to the user as tabs. In this embodiment, the file tab mimics a preview tab, complete with the affordance to open the content in a full tab. If opened in a full tab the newly opened tab would have the same features as the current display. Next to the file name is the namespace and class name 470 that contains the content being viewed. This additional information presented in the header 420 is provided in order to permit the users to orient themselves to the content they are browsing. This display of information in the header 420 allows the users to spend less time scrolling through the content trying to find the containing context (class name etc.) than in traditional methods.

Line 421 demarcates the border between the navigation area 423 on the right hand side of line 421 and the content area 422 on the left hand side of line 421. If there are results to be shown to the user on the right hand side, they would be left aligned with this line. Results that could be shown in this space can include history from the back button 440, options of other files or documents that could have relationships under tabs 450 and 460 as well as other information that may assist the developer in understanding the current displayed information in the viewport 410.

FIG. 5 illustrates an example of the viewport 410 according to an alternative or complementary embodiment. FIG. 5 illustrates the ability for the user to scroll or move to different parts of the document that is displayed as the entity of interest in the viewport 410. As the content 422 of the viewport 410 is larger than the screen real estate given to the viewport 410 by the editor 120, the user needs to be able to scroll the document to view the entire entity of interest. In this embodiment, scroll bars 510 and 520 are illustrated. Scroll bar 510 is illustrated on the right hand side of the viewport 410. In this embodiment, scroll bar 510 is sized so as to provide the user with information as to the relative size of the entity of interest in the vertical direction as against the size of the viewport 410. Scroll bar 520 is illustrated at the bottom portion of viewport 410. Scroll bar 520 is sized so as to provide the user with information as to the relative size of the entity of interest in the horizontal direction as against the size of the viewport 410. If the entire portion of the entity of interest is able to be displayed in the viewport 410, then scroll bars 510 and 520 are not displayed. Further, if the entire portion of the entity of interest in one direction, either horizontal or vertical, can be displayed then the corresponding scroll bar for that direction may not be displayed. In some embodiments the scroll bars 510 and 520 are displayed constantly on the user interface 110. In other embodiments, the scroll bars 510 and 520 are displayed only when the user moves the cursor over the location in the display where the scroll bar 510 and 520 resides. In this embodiment, the viewport 410 may provide a visual indicator that there is additional information that is not displayed in the entity of interest to the user. This visual indication can be any indication that would inform the user that there is more information present separate from the scroll bar, such as showing a top or bottom portion of a text line along the boundary box 415 of viewport 410.

FIG. 6 illustrates an example of the viewport 410 according to an alternative or complementary embodiment. As discussed above, when the viewport 410 is populated with the entity of interest, the provider 170 may provide to the viewport controller module 140 the entire document or file that contains the entity of interest along with position information that the viewport controller module 140 can use to position the document such that the entity of interest is displayed in the viewport 410, and the other portions of the document are not directly displayed in the viewport 140. For example, the display that the user would first see in this embodiment would be similar to the display illustrated in FIG. 5. However, as the entire document or file is displayed the scroll bars 510 and 520 would indicate to the user that there is more information in the document 180 that the user can view.

Often times it is the information around the entity of interest that provides the developer with the information that they were seeking or better helps the developer to understand the context of the entity of interest. Through viewport 410 the developer is able to scroll through the entire document to view the associated text, information and code. However, in many situations if the user is browsing through the document they will leave the entity of interest and may forget where in the document the entity of interest was. To help the user quickly and easily find the entity of interest in the viewport a number of different approaches may be employed by the system 100.

In the embodiment illustrated in FIG. 6 the user has scrolled beyond the entity of interest into a separate portion of the document 180 in the viewport 410. The entity of interest is illustrated by reference number 610. The additional information of the document is illustrated by reference number 620. In this embodiment the developer has wished to view the information that occurs prior to the entity of interest 610. However, the user could as easily view the information after the entity of interest 610. To visually demark the separation between the entity of interest 610 and the additional information 620, in one embodiment, different backgrounds are used behind the text. In one embodiment the entity of interest 610 is displayed using a lighter background than the background of the additional information 620. In order to determine where the background should change, the viewport controller module 140 uses the position information provided by the provider 170 to create the visual separation. Through the use of the different background colors or shading the user is able to quickly tell if they are viewing the entity of interest 610 or information outside of the entity of interest 620.

While FIG. 6 illustrates viewing the document and using shading to identify the areas inside and outside the entity of interest other embodiments make use of different approaches for providing this information to the user. In one embodiment, scroll bars, such as scroll bars 510 and 520, are used to indicate to the user that the entity of interest 610 is part of a larger file. For example the user would see that the slider within the scroll bar is located at point between the top and the bottom of the scroll bar. As the user moves through the document the scroll bar would indicate where in the document the user is currently relative to the overall size of the document. In some embodiments, in order to make it easy for the user to return to the entity of interest, an enhanced scroll bar is presented to the user. The enhanced scroll bar in one embodiment leaves a ghost image of the slider of the scroll bar at the location of the entity of interest 610. This ghost image allows the user to quickly bring the view in the viewport 410 back to the correct location by moving the slider back to that location. In an alternative embodiment, the user may simply click on the indicated location on the scroll bar and the view automatically returns to the entity of interest 610. In yet another alternative embodiment, an indication is presented to the user that allows for the rapid jumping back to the entity of interest, such as a command button or hotkey.

In yet another embodiment, the entry and exit points from the entity of interest may be imparted with Frixel effects. Frixel effects cause the user to impart additional force or action to move past the Frixel point. This additional gravity provides the user with feedback indicating that they are leaving or entering the entity of interest 610 (i.e. crossing a boundary between the entity of interest and the remainder of the document). The impartation of these features is handled by the viewport controller module 140 based on the information provided to it from the provider 170 of the document 180. While, each of these approaches to helping the user realize where in the document the entity of interest resides is discussed as being used separately, it should be noted that any combination of these approaches could be used together to better assist the user in finding the entity of interest.

Another feature of the system 100 is the ability for the user to perform recursive or cascading peeks through the viewport 410. A cascading peek is one where the user identifies an identifier in the code displayed in the viewport 410 that they wish to look at the set of relationships in which that particular identifier participates, similar to how the user activated the original viewport 410.

Figure 7:
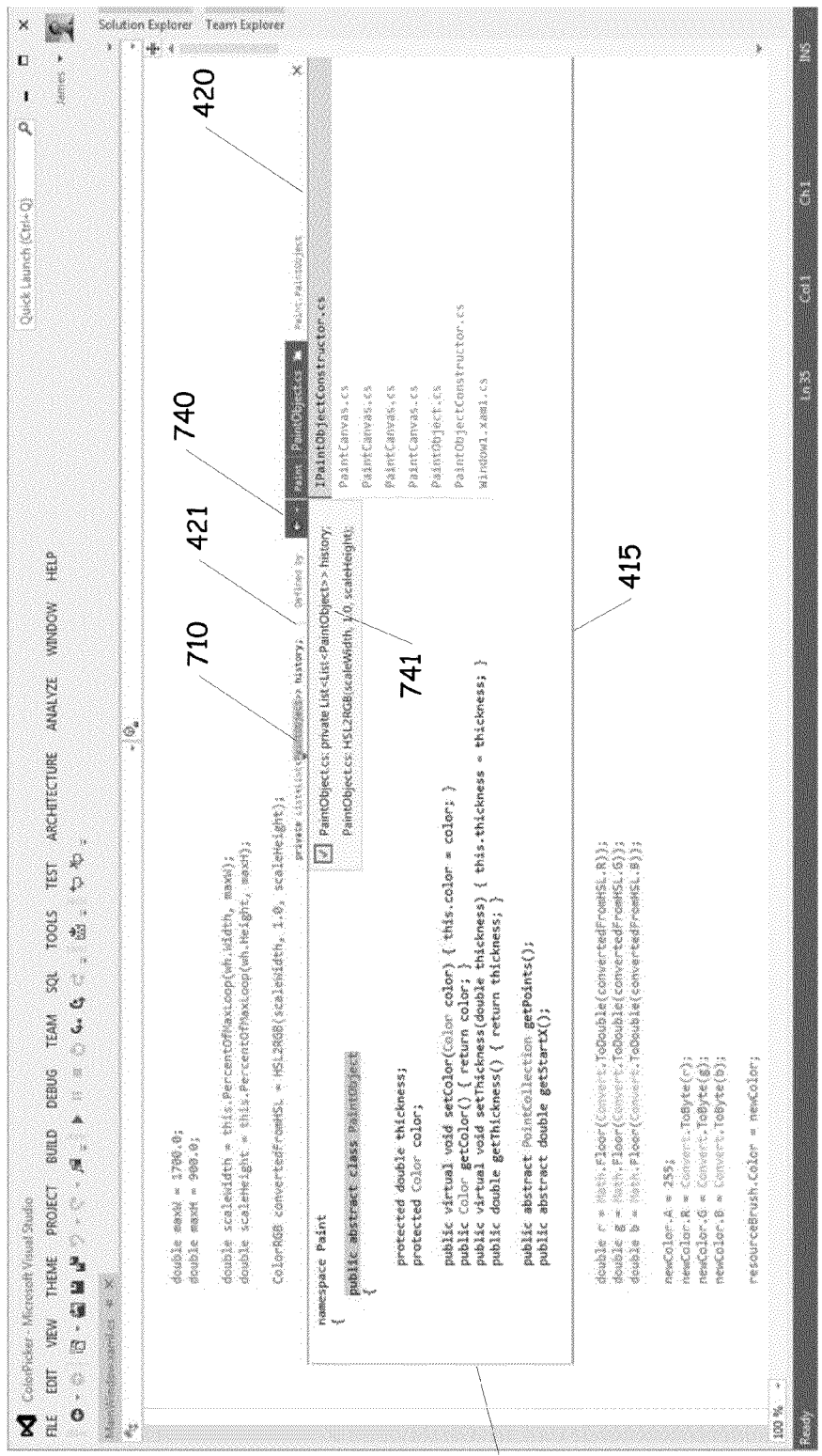
FIG. 7 is an illustrative screen display illustrating the process of cascading or recursive views within the viewport according to one illustrative embodiment.

FIG. 7 illustrates a screen that may be displayed to the user when performing a recursive or cascading peek according to one embodiment. (e.g. the user has peeked at a first, a second, a third, and subsequent documents through the viewport 410) In FIG. 7 the original code that was displayed in FIGS. 4, 5 and 6 is illustrated by reference number 401 and 402, the viewport 410 and the viewport box 415. Also displayed in FIG. 7 is the header bar 420 along with line 421. However, in contrast to FIG. 4 to the left of line 421 is displayed the relationship of the current view in the viewport to the history of actions or peeks taken by the user. This is illustrated by element 710. The purpose of the line of code illustrated at 710 is to enable the user to easily understand what they are viewing in the viewport 410 when they do a recursive or cascading peek. Without this affordance, the user could go away from the viewport 410 and then return to it later and not remember what the content is that is currently displayed inside the viewport 410.

In the example illustrated in FIG. 7, the user has performed a series of recursive or cascading peeks. In this example the user has peeked at the PaintObject identifier in the declaration of the history variable (this would have been shown on the first peek that the user performed). The back button 740 (similar to back button 440) is now enabled and the launch point 411 in the main editor is no longer shown as highlighted. However, in other embodiments, the original launch point 411 will remain highlighted such that the user has an understanding as to how they initially entered into the viewport 410. When the user reads the entire header 420 according to the embodiment of FIG. 7, the user reads the line as saying that the PaintObject is defined by the content shown in the main peek viewport (which is located in the PaintObject.cs file inside the Paint project). The history drop down menu 741 (or history indicator) also shows the items that the user has peeked at during the current session. In this example the drop down shows that the user peeked at the line of code that declares the variable history. However, in other embodiments the system 100 may save the history of the peeks by persisting the state of the history for the viewport and associating the history with the code. In this embodiment when the user returns to the document, the viewport 410 is maintained in its previous state.

Each time the user presses or interacts with the back button 740, the content in the viewport 410 and the header bar 420 is updated. In some embodiments the back button 740 is replaced with a series of dots or other indicators that provide the user with a visual indicator of where the user is in the chain of peeks.

Figure 8:
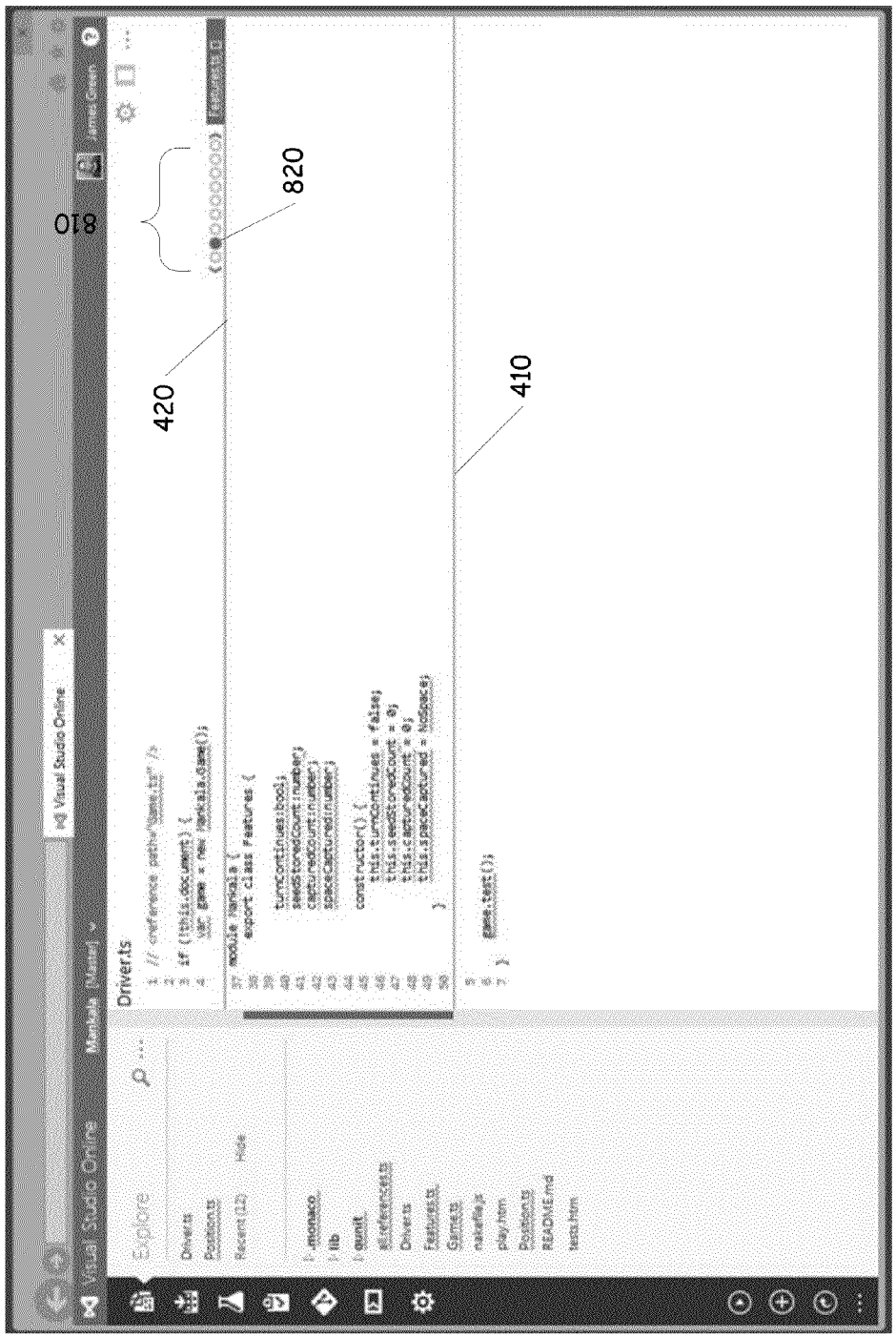
FIG. 8 is an illustrative screen display illustrating the use of a history bar in the header of the viewport when cascading peeks has been enabled according to one illustrative embodiment.

FIG. 8 illustrates an example display where the back button 740 has been replaced by history bar 810. In this embodiment the history bar 810 is illustrated by a plurality of location dots or other indicators. Each of the dots in the history bar 810 represents a different inline peek that has been made by the user. In the embodiment illustrated by FIG. 8, dot 820 is highlighted and represents the point in the viewport history that the user is currently located. The remaining dots are not highlighted, and represent documents in the viewport history where the user has previously viewed. The user may jump to different inline peeks by indicating over one of the dots 810 in the history representative of view the user wishes to see. In some embodiments, if the user hovers the cursor over one of the dots 810, information, such as the relationship information regarding the dot is displayed to the user via a floatie menu or other way of indicating information to the user via a pop-up menu. In some embodiments, each dot 810 represents a launch point or a landing point in the viewport history. This allows the user to visually understand the process that took the user to or from any particular viewport 410. For example, if the user was in one viewport 410 and clicked on the dot to the left of the currently active dot 820, indicating that the user wanted to go back one relationship, the click would take the user to the launch point in the previous viewport document. Moving to the next dot to the left would take the user to the landing point in that document. Conversely, the user may move forward in the process as well. However, in other embodiments, the user may simply be taken back to a point in the previous viewport document. In other embodiments the user may also be able to indicate points of interest in the viewport 410 that they would like to store in the history bar 810. These points of interest may be other identifiers, code of interest in the document, or anything else that the user wishes to be able to return to in the document 180 or the entity of interest. In some embodiments the back button 740 takes the user one level up in the relationship tree as opposed to the previously last viewed viewport.

Figure 9:
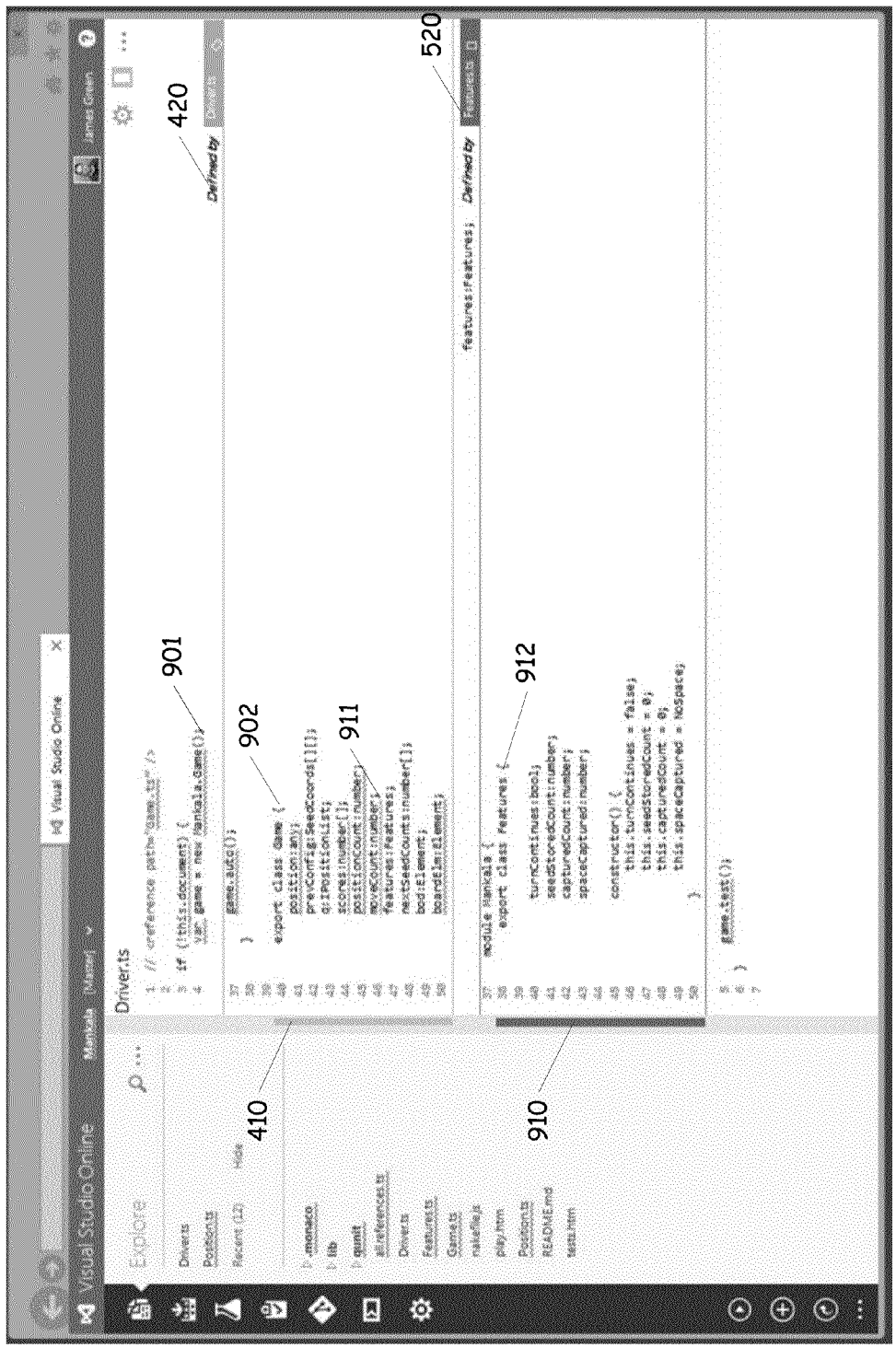
FIG. 9 is an illustrative screen display illustrating the insertion of multiple viewports into the native code when performing cascading peeks according to one illustrative embodiment.

FIG. 9 illustrates an example display where several of the inline peeks are displayed simultaneously in the original code. Illustrated in FIG. 9 are two separate inline peeks visible through their respective viewports. Viewport 410 is the top peek in the group of peeks. Viewport 910 is the second viewport in the group of peeks. While only two viewports are illustrated in FIG. 9, more viewports can be displayed, depending on the configuration of the editor. Viewport 910 includes a header similar to header 420 of viewport 410. However as viewport 910 is a child of viewport 410 additional information is provided on the header 920 so that the user understands and can appreciate the path that brought them to viewport 910.

Also illustrated in FIG. 9 are a series of launch points and landing points. As discussed earlier a launch point is the identifier that the user indicated that they desired to view the relationships about. Landing points are the point in the viewport document where the launch point brought the user to. As such, the user would see that they launched from launch point 901 and arrived at landing point 902. The user would also see that they launched from launch point 911 and landed at landing point 912. The launch and landing points can be displayed such that the user can easily identify the difference between a launch point and a landing point in the same document. This can be achieved by, for example, using a different color for landing and launching points.

Further, to help the user understand the relationship between the two viewports 410 and 910, the same highlighting color can be used for the launch point 901 and landing point 902 and a different highlighting color can be used for the launch point 911 and the landing point 9022. In some embodiments the multiple viewports 410 and 910 need not be consecutive views in the cascade of views. The user has the ability to decide which viewports they wish to "pin" to the editor display. In the embodiments where the viewports 410 and 910 are not consecutive the header bars 420 and 920 can include the history bar 810. As each viewport 410 and 910 are different views the respective history bars will have different levels indicated. The user can navigate through the history bar in either viewport just as they would in any other viewport. Again as the user navigates the history bar, the header bar will change to reflect the appropriate information.

In some embodiments of the present system, the IDE system 100 is configured to permit the user to edit the code or document that is presented in the viewport 410 from within the viewport 410. This ability to edit in the viewport 410 allows the user to perform many tasks while appreciating how the changes may impact the code they were working in. While the present discussion discusses the act of editing the document from within the viewport other actions can be taken from within the viewport 410. These actions can include actions taken by developers such as testing code, debugging code, data mining, generating or obtaining help, etc. In some embodiments, the code or document displayed in the viewport is not initially editable. In this embodiment the user would need to "promote" the document to covert it from a "read only" status to an editable status. When the user promotes the document, the editor 120 activates the editor 150 to edit the document in the viewport. In some embodiments the act of promoting the document causes an additional tab to open on the primary editor display such that the user can visually see in the top tab well (element 413 in FIG. 4) that there are additional documents that are opened and available for editing. With the tab well approach the user has the option to edit the document either in the viewport 410 or edit the document directly in the tab associated with the tab well. In other embodiments the act of promoting the document causes the document to be opened in another viewer or program from which the document may be edited. This typically would occur when the editor 120 is not configured to edit the particular type of document that is displayed within the viewport 410. However, in other embodiments, the document is automatically promoted when the user opens the document in the viewport.

When the user edits the document inside the viewport 410 the edits can be done in a real time manner. In this real time editing of the document, as the user makes the changes to the document, either in the viewport 410 or in the tab or other viewer that was opened when the document was promoted, the changes are shown in the other areas where the document is displayed as they occur. Thus, the changes that the user makes appear in both versions. This allows the user to make changes in whatever environment they prefer, while having the changes appear in all the views. In the present embodiments the user is able to edit from within the viewport 410 both text and/or code within the entity of interest, but also those portions of text that fall outside the entity of interest. The user in this embodiment simply scrolls, or otherwise navigates to the location in the document where they desire to edit and conducts the edit as they would normally do within the editor 120. When system 100 is configured to allow for cascading peeks the user can edit and promote any document in the cascade through the viewport. Each document that the user promotes will show in the tab well, while only one document will be available for editing within the viewport 410. Edits made to documents through the tab well will show in the edited form when the user returns or views that document through the viewport at a later time. In the embodiments where the user has multiple viewports open such as viewports 410 and 910, the user may have the option of editing one or both of the documents displayed from within the viewport. Similarly, any document promoted by the user from the viewports 410 and 910 can be shown in the tab well.

In some embodiments the editor 120 shows a diff view of the document as the user performs the edits. This diff view allows the user to appreciate the changes that have been made to the document from when the document was originally pulled from the provider 170. The diff view can use common ways of showing changes to documents, such as cross out and underlining, or using color to highlight changes. Once the user has completed any changes to the document the user can save the modified document. This causes the editor to send back to the provider the changes for the provider to store in its own storage areas. However, in some embodiments the real time aspects of the editing cause the version at the provider to be updated at the same time as well.

Figure 10:
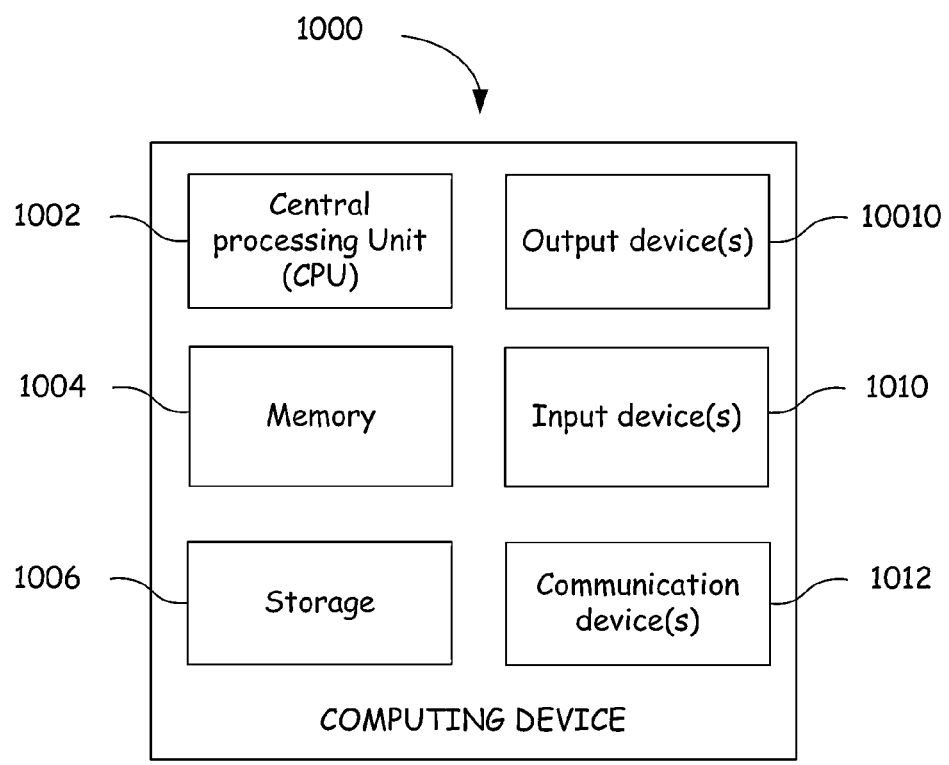
FIG. 10 is a block diagram illustrating a computing device which can implement the inline view system according to one embodiment.

FIG. 10 illustrates a component diagram of a computing device according to one embodiment. The computing device 1000 can be utilized to implement one or more computing devices, computer processes, or software modules described herein. In one example, the computing device 1000 can be utilized to process calculations, execute instructions, receive and transmit digital signals. In another example, the computing device 1000 can be utilized to process calculations, execute instructions, receive and transmit digital signals, receive and transmit search queries, and hypertext, compile computer code, as required by the system of the present embodiments. Further, computing device 1000 can be a distributed computing device where components of computing device 1000 are located on different computing devices that are connected to each other through network or other forms of connections. Additionally, computing device 1000 can be a cloud based computing device.

The computing device 1000 can be any general or special purpose computer now known or to become known capable of performing the steps and/or performing the functions described herein, either in software, hardware, firmware, or a combination thereof.

In its most basic configuration, computing device 1000 typically includes at least one central processing unit (CPU) 1002 and memory 1004. Depending on the exact configuration and type of computing device, memory 1004 may be volatile (such as RAM), non-volatile (such as ROM, flash memory, etc.) or some combination of the two. Additionally, computing device 1000 may also have additional features/functionality. For example, computing device 1000 may include multiple CPU's. The described methods may be executed in any manner by any processing unit in computing device 1000. For example, the described process may be executed by both multiple CPU's in parallel.

Computing device 1000 may also include additional storage (removable and/or non-removable) including, but not limited to, magnetic or optical disks or tape. Such additional storage is illustrated in FIG. 5 by storage 1006. Computer storage media includes volatile and nonvolatile, removable and non-removable media implemented in any method or technology for storage of information such as computer readable instructions, data structures, program modules or other data. Memory 1004 and storage 1006 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 1000. Any such computer storage media may be part of computing device 1000.

Computing device 1000 may also contain communications device(s) 1012 that allow the device to communicate with other devices. Communications device(s) 1012 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 1000 may also have input device(s) 1010 such as keyboard, mouse, pen, voice input device, touch input device, etc. Output device(s) 1008 such as a display, speakers, printer, etc. may also be included. All these devices are well known in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method comprising:
    determining at least one identifier in a portion of code;
    associating a set of relationships with the at least one identifier;
    receiving an indication of a selection of a relationship in the set of relationships;
    accessing a document associated with the selected relationship; and
    opening in the portion of code at least a portion of the document in a viewport wherein opening the viewport comprises;
        creating a visual break point in the portion of the code at a location of the at least one identifier;
        displacing a second portion of the code that is after the location of the at least one identifier;
        inserting the viewport in a space between the location and the second portion of the code; and
        maintaining a history of actions wherein the history of actions includes a history of documents that have been inserted into the code through the viewport.

2. The method of claim 1 wherein determining at least one identifier further comprises:
    determining that a portion of text in the portion of code is associated with metadata, another identifier, or other information.

3. The method of claim 1 wherein determining at least one identifier further comprises:
    receiving an indication from a user that a portion of text in the portion of the code is the identifier.

4. The method of claim 1 wherein associating the set of relationships further comprises:
    passing the at least one identifier to at least one provider; and
    receiving from the at least one provider an indication that the at least one provider has a document related to the identifier.

5. The method of claim 1 further comprising:
    displaying the set of relationships to be on a user interface.

6. The method of claim 5 wherein displaying the set of relationships further comprises:
    displaying the set of relationships on a floatie menu.

7. The method of claim 1 wherein displaying at least a portion of the document in the viewport comprises:
    identifying an entity of interest in the document; and
    displaying the entity of interest in the viewport.

8. The method of claim 7 wherein displaying the entity of interest further comprises:
    displaying the entity of interest differently from a portion of the document that is not part of the entity of interest.

9. The method of claim 8 further comprising:
    inserting a Frixel effect at a boundary point between the entity of interest and the portion of the document that is not part of the entity of interest.

10. The method of claim 1 further comprising:
    determining a second identifier in the document displayed in the viewport;
    associating a second set of relationships for the second identifier;
    receiving an indication of a selection of a second relationship in the second set of relationships;
    accessing a second document associated with the selected second relationship; and displaying the second document in the viewport.

11. The method of claim 10 wherein displaying the second document in the viewport comprises:
opening a second viewport in the portion of code.

12. The method of claim 1 further comprising:
instantiating an embedded editor in the viewport.

13. A system having at least one processor for inserting a viewport into a portion of code under development, comprising:
a peek command module configured to determine a request for a set of relationships for at least one identifier in the portion of code;
a viewport controller module configured to create a viewport in the portion of the code by inserting at least a portion of a document into the portion of code, wherein the viewport controller module is further configured to maintain a history of documents that have been inserted into the code through the viewport and wherein the viewport controller module is further configured to determine a location of the at least one identifier in the portion of the code; and insert the viewport below the location by moving a second portion of the portion of the code to a second location such that the viewport is disposed between the location and the second location;
a broker configured to determine the set of relationships for the at least one identifier received from the peek command module, and to request the document associated with at least one relationship; and
at least one provider configured to provide the at least one relationship to the broker in response to a request from the broker for the set of relationships.

14. The system of claim 13 wherein the peek command module is further configured to determine a selection of a relationship in the set of relationships and to request a document associated with the selected relationship.

15. The system of claim 13 wherein the viewport controller module is further configured to create a second viewport in the portion of the code.

16. The system of claim 13 wherein the viewport controller module is further configured to modify the document such that an entity of interest in the document is displayed differently from a portion of the document that is not part of the entity of interest.

17. The system of claim 13 wherein the viewport controller module is further configured to:
determine a location of the at least one identifier in the portion of the code; and
insert the viewport below the location by moving a second portion of the portion of the code to a second location such that the viewport is disposed between the location and the second location.

18. A computer readable hardware storage media having computer executable instructions that when executed by at least one computer cause the at least one computer to:
determine at least one identifier in a portion of code;
associate a set of relationships with the at least one identifier;
receive an indication of a selection of a relationship in the set of relationships;
access a document associated with the selected relationship;
open in the portion of code at least a portion of the document in a viewport by:
creating a visual break point in the portion of the code at a location of the at least one identifier;
displacing a second portion of the code that is after the location of the at least one identifier; and
inserting the viewport in a space between the location and the second portion of the code; and
add the at least a portion of the document to a history of actions, wherein the history of actions includes a history of documents that have been inserted into the code through the viewport.

* * * * *